US012759389B2

(12) United States Patent
Wegner et al.

(10) Patent No.: US 12,759,389 B2
(45) Date of Patent: Oct. 13, 2026

(54) POWERED VEHICLE MODIFICATION AND METHOD OF ASSEMBLY THEREOF

(71) Applicant: The Braun Corporation, Winamac, IN (US)

(72) Inventors: Christopher C. Wegner, Winamac, IN (US); Nate L. Martindale, Star City, IN (US)

(73) Assignee: The Braun Corporation, Winamac, IN (US)

( * ) Notice: Subject to any disclaimer, the term of this patent is extended or adjusted under 35 U.S.C. 154(b) by 316 days.

(21) Appl. No.: 18/465,588

(22) Filed: Sep. 12, 2023

(65) Prior Publication Data

US 2024/0092158 A1 Mar. 21, 2024

Related U.S. Application Data

(60) Provisional application No. 63/407,968, filed on Sep. 19, 2022.

(51) Int. Cl.

| | |
|---|---|
| ***B60K 6/28*** | (2007.10) |
| ***B60K 11/06*** | (2006.01) |
| ***B62D 65/00*** | (2006.01) |

(52) U.S. Cl.
CPC ................ *B60K 6/28* (2013.01); *B60K 11/06* (2013.01); *B60Y 2200/92* (2013.01); *B62D 65/00* (2013.01)

(58) Field of Classification Search
CPC ...... B60K 6/28; B60K 11/06; B60Y 2200/92; B62D 65/00
USPC ........................................................ 180/65.21
See application file for complete search history.

(56) References Cited

U.S. PATENT DOCUMENTS 5,115,116 A * 5/1992 Reed ........................ B60R 16/04 219/202
6,059,016 A * 5/2000 Rafalovich ............. F28D 20/02 165/41
6,179,078 B1 * 1/2001 Belloso .................... B60K 5/08 180/69.6
6,827,168 B2 * 12/2004 Miyazaki ................ B60R 19/00 180/274
(Continued)

FOREIGN PATENT DOCUMENTS

KR 20080032171 A 4/2008

OTHER PUBLICATIONS

PCT International Searching Authority for the European Patent Office, International Search Report and Written Opinion for PCT/US2023/073931, Feb. 1, 2024, 11 pages.

*Primary Examiner* — Hau V Phan
(74) *Attorney, Agent, or Firm* — Daniel Tallitsch; Tyler Schultz

(57) ABSTRACT

A powered vehicle includes a chassis having a front end and a rear end, and at least one front wheel and at least one rear wheel for supporting the chassis. The at least one front wheel defines a front axle and the at least one rear wheel defines a rear axle. A first portion of the vehicle defines an interior in which at least one seat is located. A second portion of the vehicle is located outside of the interior. The first and second portions are at least partially separated by a wall. A power system for propelling the vehicle is located in the second portion, where the power system includes a HV battery for producing electrical power to propel the vehicle. The battery is coupled to the chassis and located in the second portion.

20 Claims, 14 Drawing Sheets

(56) References Cited

U.S. PATENT DOCUMENTS

| | | | | |
|---|---|---|---|---|
| 7,325,638 | B1 * | 2/2008 | Belloso | B60K 6/24<br>475/5 |
| 7,410,021 | B1 * | 8/2008 | Belloso | B60K 5/08<br>477/6 |
| 7,468,562 | B1 * | 12/2008 | Barbic | B60L 53/00<br>290/40 C |
| 8,196,691 | B2 * | 6/2012 | Moine-Picard | B60R 16/04<br>180/68.5 |
| 8,701,811 | B2 * | 4/2014 | Robinson | B60K 11/06<br>180/68.5 |
| 8,919,466 | B2 * | 12/2014 | Suzuki | B60K 1/00<br>180/65.21 |
| 10,093,364 | B2 | 10/2018 | Seo et al. | |
| 10,144,411 | B2 * | 12/2018 | Belloso | B60W 10/08 |
| 2001/0015299 | A1 * | 8/2001 | Moore | B60K 6/40<br>180/197 |
| 2008/0197810 | A1 * | 8/2008 | Ishikawa | B60L 15/209<br>320/135 |
| 2009/0044997 | A1 * | 2/2009 | Picavet | B60R 16/04<br>180/68.5 |
| 2010/0038156 | A1 * | 2/2010 | Fujitake | B60L 53/14<br>180/65.21 |
| 2013/0174804 | A1 * | 7/2013 | Matsuda | B60K 15/063<br>123/198 R |
| 2015/0380781 | A1 | 12/2015 | Steinmeyer et al. | |
| 2017/0158045 | A1 * | 6/2017 | Goehring | B60K 6/26 |
| 2017/0226967 | A1 * | 8/2017 | Dudar | B60K 15/035 |
| 2020/0381923 | A1 * | 12/2020 | Chow | H01M 10/4207 |

* cited by examiner

POWERED VEHICLE MODIFICATION AND METHOD OF ASSEMBLY THEREOF

CROSS REFERENCE TO OTHER APPLICATIONS

This application claims priority to U.S. Provisional Patent Application Ser. No. 63/407,968, filed on Sep. 19, 2022, which is incorporated herein by reference. This application also incorporates by reference PCT Application No. PCT/US23/73931, filed on 12 Sep. 2023.

FIELD OF THE DISCLOSURE

The present disclosure relates to a powered vehicle, and more particularly to a powered vehicle capable of transporting one or more physically limited passengers.

BACKGROUND

Automobile manufacturers do not currently mass-produce passenger vehicles specifically designed to transport passengers having physical limitations, either as a driver or a passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van may be retrofitted with a ramp to enable a physically limited individual using a wheelchair to enter the vehicle without the assistance of another individual.

Other known level change devices for retrofitting a vehicle, such as a van, include wheelchair lifts, lift platforms, and lowered floor surfaces. In some instances, a door of an original equipment manufacturer (OEM) van may be enlarged or otherwise modified to permit entry of the physically limited individual through what is known as the assisted entrance. Once inside the vehicle, individuals may operate the vehicle as a vehicle operator or occupy locations designated for passengers. This may include, but is not limited to, a front passenger location or rear passenger locations.

Many motorized vehicles modified to include a ramp or lift for transporting physically limited passengers are passenger vans or buses. Minivans, or passenger vans, are often referred to as multi-purpose vehicles (MPVs), people movers, or multi-utility vehicles. At least in the United States, minivans are classified as light trucks or MPVs. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles. The modified vehicles are often diesel or gasoline-powered.

SUMMARY OF THE EMBODIMENTS

In one embodiment of the present disclosure, a powered vehicle includes a chassis having a front end and a rear end, and at least one front wheel and at least one rear wheel for supporting the chassis. The at least one front wheel defines a front axle and the at least one rear wheel defines a rear axle. A first portion of the vehicle defines an interior and a second portion of the vehicle is located outside of the interior. The first and second portions are at least partially separated by a wall. The vehicle includes a power system for propelling the vehicle, where the power system is located in the second portion. An HV battery of the power system is provided for producing electrical power to propel the vehicle. The battery is coupled to the chassis and located in the second portion.

In one example of this embodiment, the battery is located at least partially forward of the power system. In a second example, the battery is located at least partially above the power system. In a third example, the battery is located forward of the front axle. In a fourth example, the power system comprises an engine. In a fifth example, an all-wheel electrical drive unit is located towards the rear end of the chassis. In a sixth example, a fuel tank is fluidly coupled to the drive system and located towards the rear end of the chassis.

In a seventh example, an outer housing substantially encloses the battery. In an eighth example, a battery mounting assembly is provided for coupling the battery to the chassis in the second portion, the mounting assembly comprising a cowling support bracket coupled to the chassis, a first support bracket and a second support bracket coupled to the cowling support bracket, and a plurality of battery mounting brackets for coupling to the battery. In a ninth example, the battery mounting assembly is pivotally coupled to the cowling support bracket. In a tenth example, at least one hinge is coupled to the cowling support bracket, the at least one hinge being coupled to the first or second support bracket.

In an eleventh example, the battery is pivotal between a lowered position and a raised position. In a twelfth example, when the battery is in its raised position, an open space is formed between the battery and power system. In a thirteenth example, a radiator support cap includes a plurality of openings such that the first and second support brackets are removably coupled to the radiator support cap. In a fourteenth example, the radiator support cap includes a slot, a first open end and a second open end, the slot forming a first intake inlet, the first open end forming a second intake inlet, and the second open end forming a third intake inlet.

In a fifteenth example, an actuator assembly is coupled between the battery and the chassis. In another example, a cooling system is coupled between the interior of the vehicle and the battery, the cooling system being configured to move air from the interior to the battery to cool the battery. In yet another example, the cooling system includes a ducting port coupled to the wall and fluidly coupled to the interior, a duct coupler fluidly coupled to the ducting port for receiving air therefrom, and at least one fan for suctioning the air from the duct coupler. Here, the at least one fan is configured to blow the air from the duct coupler to a cooling duct coupled to the battery such that the air blown from the fan passes through the cooling duct and into the battery.

In a further example, a fan coupler is coupled between the duct coupler and the at least one fan. In yet a further example, a hose is coupled between the ducting port and the duct coupler. In still another example, the duct coupler comprises an inlet and at least two outlets, where one of the at least two outlets is coupled to the fan coupler. In yet another example, the second of the at least two outlets is coupled to a cooling duct. In a further example, the cooling duct is coupled between the duct coupler and a second duct coupler, the second duct coupler being coupled to a second fan. In still a further example, the second fan suctions air through the cooling duct and second duct cooler and blows the air into a second cooling duct coupled to the battery.

In another embodiment of the present disclosure, a method is provided for modifying an existing powered vehicle. Here, the vehicle includes a chassis, one or more wheels supporting the chassis, and a power system for propelling the vehicle in a travel direction. The method includes providing the vehicle with a first portion defining an interior cab and a second portion, the first portion and second portion being at least partially separated by a wall. The method also includes coupling an engine of the power system to the chassis in the second portion, and coupling a HV battery of the power system to the chassis in the second portion such that the battery is located at least partially forward of the engine.

In one example of this embodiment, the method includes coupling the battery at least partially above the engine in the second portion. In a second example, the method includes providing the one or more wheels with a front wheel defining a front axle of the vehicle, and coupling the battery to the chassis forward of the front axle. In a third example, the method includes providing the one or more wheels with a rear wheel defining a rear axle of the vehicle, and coupling an all-wheel drive unit to the chassis at or adjacent to the rear axle.

In a fourth example, the method includes providing the one or more wheels with a rear wheel defining a rear axle of the vehicle, and coupling a fuel tank to the chassis at or rearward of the rear axle. In a fifth example, the battery is pivotally coupled to the chassis. In a sixth example, the method includes coupling a cowling support bracket to the chassis, the cowling support bracket comprising a hinge about which the battery pivots relative to the chassis.

In another example of this embodiment, the method includes pivoting the battery from a lowered position to a raised position, and forming an open space between the battery and the engine. In yet another example, the method includes providing a battery mounting assembly coupled to the battery, the battery mounting assembly pivotally coupled to the chassis. In a further example, the method includes coupling a radiator support cap to a radiator support bracket, and coupling the battery mounting assembly to the radiator support cap in a lowered position. In yet a further example, the method includes decoupling the battery mounting assembly from the radiator support cap, and pivoting the battery from the lowered position to a raised position.

In an alternative example, the method may include providing an original battery cable coupled to the HV battery and reusing the original battery cable without adding any length thereto after the positioning step. In a further example, the method may include lowering the engine relative to the chassis, forming a space above the engine, and coupling the HV battery in the space during the positioning step.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
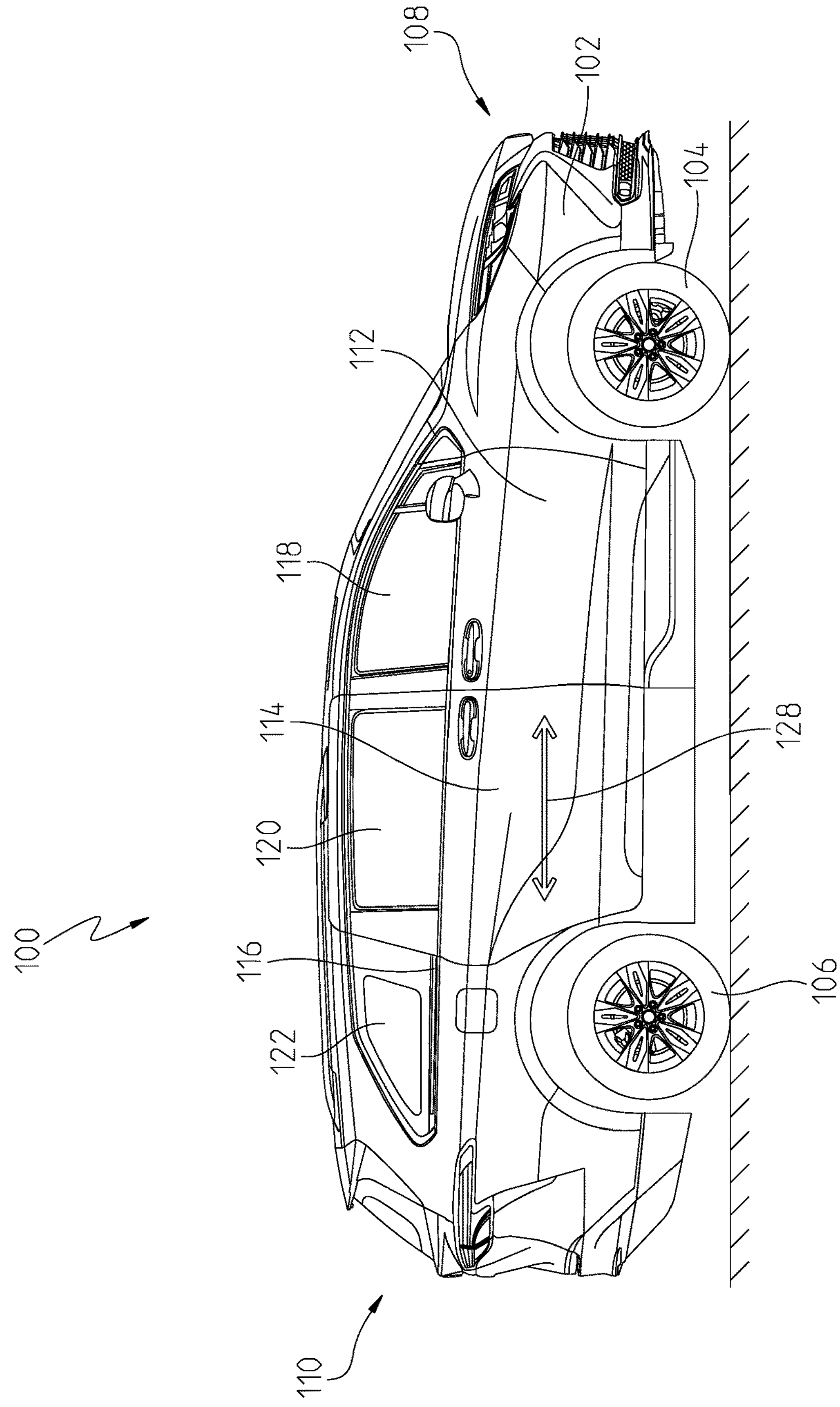
FIG. 1 is a side view of a motorized hybrid vehicle.

FIG. 1 illustrates an embodiment of a powered vehicle 100 available from any number of United States and foreign manufacturers. In the illustrated embodiment, the vehicle 100 may a unibody construction. Other vehicles, however, contemplated within this disclosure may include a frame on body construction. Consequently, the use of the powered vehicle herein includes all types and kinds of vehicles constructed with a body on frame construction, a unibody construction, or other constructions.

As shown in FIG. 1, the vehicle 100 may include a vehicle body or chassis 102 operatively coupled to front wheels 104 and rear wheels 106 which support the vehicle 100 as it traverses the ground. The front wheels 104 may define a front axle and the rear wheels 106 may define a rear axle of the vehicle 100. In one embodiment, the vehicle 100 may include a unibody construction designed off of a truck chassis. In another embodiment, the vehicle body 102 may also define a body or vehicle axis through the center of the vehicle 100. The body axis may be defined along the length of the vehicle 100. In one aspect, the vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

As shown, the vehicle 100 includes a front end 108 and a rear end 110. A conventional driver's seat and front passenger seat (not shown) are generally located towards the front end 108 of the vehicle 100, whereas a rear passenger seat (not shown) is generally located towards the rear end 110 of the vehicle. More specifically, the vehicle 100 may include an interior that comprises a front interior portion and a rear interior portion. In several embodiments, the driver's seat and front passenger seat may be located in the front interior portion, and at least one rear passenger seat may be located in the rear interior portion of the vehicle 100.

In some embodiments, the vehicle 100 may include a first or front passenger side door 112 located between the front wheels 104 and rear wheels 106 and provides access to a passenger for sitting in a front passenger seat (not shown) of the vehicle 100 adjacent to the driver. In this position, the passenger has a clear forward view of the road when compared to sitting in the rear passenger seat of the vehicle 100. Moreover, when seated, the passenger may be facing in a forward direction of travel. Further, in the illustrated embodiment of FIG. 1, the vehicle 100 may include a second or rear passenger side door 114 coupled to the unibody frame 102.

In some embodiments, the first door 112 and second door 114 may be hingedly coupled to the frame 102 of the vehicle 100. In other embodiments, at least the second door 114 may be slidably coupled to the frame 102. In FIG. 1, the second door 114 is capable of being moved along a direction indicated by arrow 128 between an open position and a closed position. A user may grasp and manipulate a door handle to manually move the door 114 between the open and closed positions. In further embodiments, a key fob or other electrical control device (not shown) may send an electrical signal to a controller for moving the door 114 between its open and closed positions.

As shown in FIG. 1, the first door 112 may include a first window 118 and the second door 114 may include a second window 120. In some embodiments, at a location rearward of the second door 114 may be a third window 122.

In one embodiment, the second door 114 of the vehicle in FIG. 1 is slidably coupled to the frame 102 of the vehicle 100. The frame 102 may include one or more tracks upon which the door is in a sliding engagement with as it moves between the open and closed positions. For example, in FIG. 1, the vehicle frame 102 may include at least a first track 116. In other embodiments, the vehicle frame 102 may include additional tracks such that the first track 116 may be located between two or more of the tracks.

Figure 2:
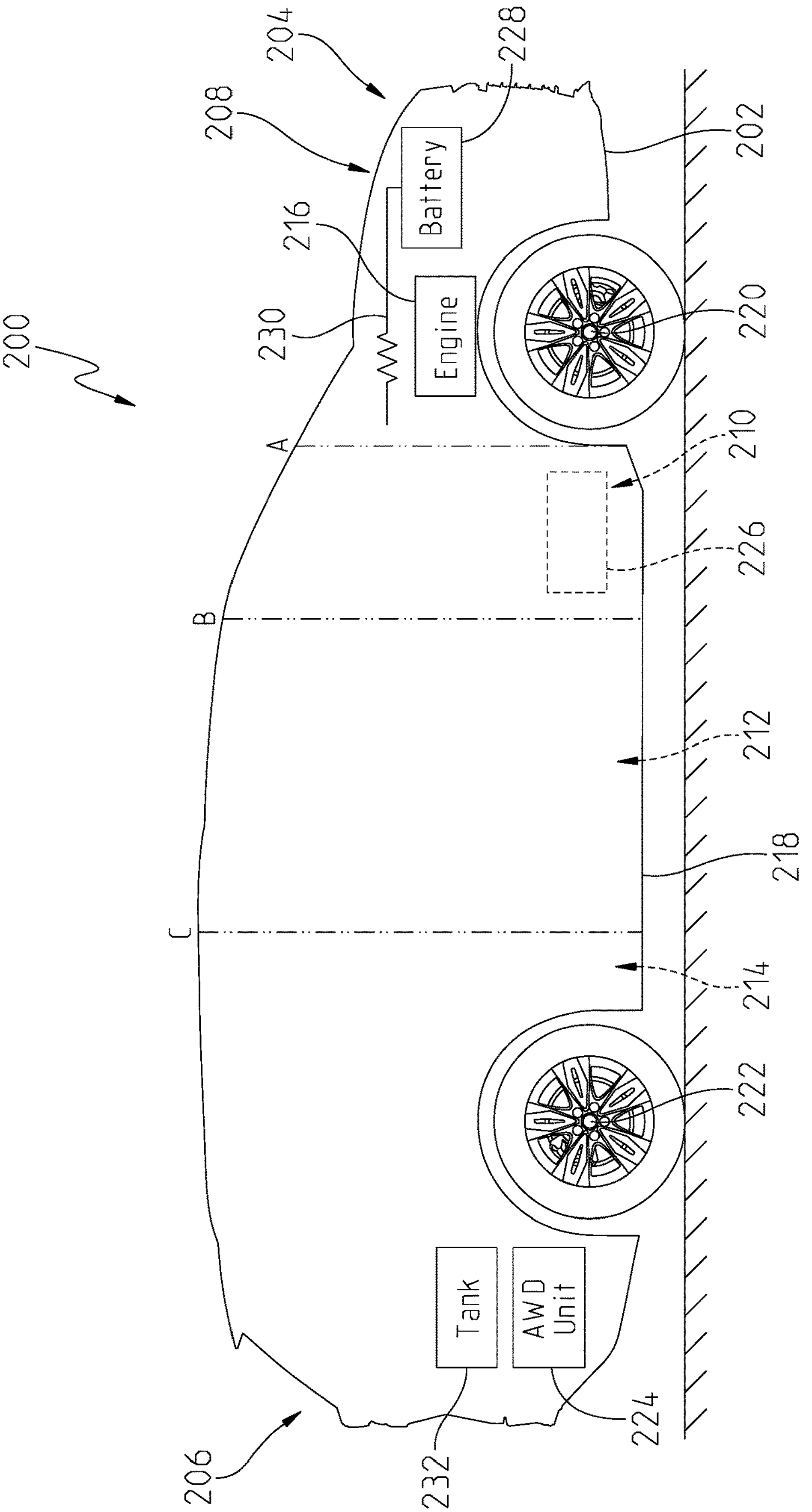
FIG. 2 is a schematic of the motorized hybrid vehicle of FIG. 1.

Referring to FIG. 2, a schematic of a powered vehicle 200 is shown. The vehicle 200 may be a hybrid vehicle in one embodiment. In another embodiment, the vehicle 200 may be an all-wheel drive, two-wheel drive, or four-wheel drive vehicle. In one embodiment, the vehicle 200 may include a frame or chassis 202 supported by wheels, tracks, or other ground-engaging mechanisms. The vehicle 200 has a front end 204 and a rear end 206, as shown in FIG. 2. The vehicle 200 may be divided into a plurality of portions or compartments. For example, an engine compartment (or, in a battery electric vehicle, a "frunk") 208 may be located at the front end 204 of the vehicle 200. An engine 216 and/or power system including, but not limited to, an electric motor, a liquid fuel internal combustion engine, etc., may be located in the engine compartment 208. For purposes of this disclosure, the engine 216 may be any device, apparatus or system capable of producing power such as an internal combustion engine, an electric motor, or other known power-producing systems. Adjacent to the engine compartment 208 is a first compartment 210. The first compartment 210 may be defined or located between an A pillar and B pillar of the chassis 202. A driver or operator seat (not shown) may be located in the first compartment 210. Moreover, a front passenger seat (not shown) may be located in the first compartment 210. In other words, a first or front row of seats of the vehicle 200 may be located in the first compartment 210. Further, unlike the engine compartment 208, the first compartment 210 may be one of a plurality of compartments or portions located within an interior or cab of the vehicle 200.

A second compartment 212 may be located to the rear of the first compartment 210. In one embodiment, the second compartment 212 may be located or defined between the B pillar and C pillar of the chassis 202. The second compartment 212 may also be located in the interior or cab of the vehicle 200. A second row of seats (not shown) may be located in the second compartment.

A third compartment 214 may be located at the rear end 206 of the vehicle 200, as shown in FIG. 2. In some embodiments, a third row of seats (not shown) may be located in the third compartment 214. In other embodiments, a truck or rear storage area may be located in the third compartment. In the illustrated embodiment of FIG. 2, the third compartment 214 may be located in the interior or cab of the vehicle 200.

In order to convert a conventional vehicle to one which is better able to accommodate a wheelchaired passenger, a floor 218 of the vehicle 200 may be lowered. The floor 218 may be dropped by a few inches in one embodiment. In another embodiment, the floor 218 may be dropped by up to 2 inches. In a further embodiment, the floor 218 may be dropped by up to 4 inches. In yet a further embodiment, the floor 218 may be dropped by up to 6 inches. In still another embodiment, the floor 218 may be dropped by six or more inches. With the floor 218 being lowered, the vehicle drivetrain including, but not limited to, the engine 216 and/or electric motor, transmission (not shown), and driveline (not shown) may be lowered from their standard height in the conventional vehicle.

In one embodiment, with the floor 218 being lowered, the body or chassis 202 of the vehicle 200 may be raised by adding one or more spacers at or near a front axle 220 and a rear axle 222 of the vehicle 200. The raising of the body or chassis 202 may provide additional headroom in the interior or cab of the vehicle 200 so that a wheelchaired passenger has more room to move about within. Moreover, the additional headroom allows a wheelchaired passenger to enter or exit the vehicle 200 more easily.

The powered vehicle 200 of FIG. 2 may be an all-wheel drive vehicle. In this embodiment, the vehicle 200 may include an all-wheel drive electrical drive unit 224, or AWD electrical drive unit. The AWD electrical drive unit 224 may include or function like one or more electric motors. When the vehicle floor 218 is lowered, the AWD electrical drive unit 224 may be relocated or moved rearward from its original position in the conventional vehicle. Thus, during the modification of a conventional vehicle to a vehicle better able to accommodate a wheelchaired passenger, the vehicle floor 218 may be lowered along with the drivetrain (e.g., engine 216 and/or electric motor) and the AWD electrical drive unit 224 may be moved rearward to be aligned with or positioned adjacent to a rear axle of the vehicle 200. In one embodiment, the AWD electrical drive unit 224 may be moved by only a few inches. For instance, in some embodiments, the AWD electrical drive unit 224 may be moved by six inches or less to a rearward position. In other embodiments, the AWD electrical drive unit 224 may be moved rearward by more than six inches.

In some embodiments, the powered vehicle 200 may be a hybrid vehicle having a high voltage battery, or HV battery. The HV battery is not intended to be confused with a normal low voltage 12-volt battery system as is customary in many, if not most, conventional vehicles. In a conventional hybrid vehicle, the HV battery may be located below the vehicle floor 218 or underneath a passenger seat in either the first compartment 210 or second compartment 212. In one embodiment, the HV battery may be originally located in a first location 226 underneath a passenger seat between the front axle 220 and rear axle 222.

In the present disclosure, a method of modifying an existing or conventional hybrid vehicle may include moving the HV battery from its original location 226 to a location 228 in the engine compartment 208. In one embodiment, the HV battery may be located at least partially above the engine 216 and/or electric motor or other power system. In another embodiment, the HV battery may be located at least partially forward or in front of the engine 216 and/or electric motor or other power system. In a further embodiment, the HV battery may be located at least partially above and/or forward of the front axle 220. In yet another embodiment, the vehicle may include a firewall 902 (see FIG. 9) which can partially separate the engine compartment 208 from the interior or cab. In this embodiment, the HV battery may be located forward of the firewall 902.

In an alternative embodiment, the HV battery may be located towards the rear end 206 of the vehicle 200. In some embodiments, locating the HV battery in the rear of the vehicle is less advantageous than when it is located in the front of the vehicle 200. First, the AWD electrical drive unit 224 is located in the rear of the vehicle 200 and this may require relocation. In some embodiments, the AWD electrical drive unit 224 may be aligned coaxially along the rear axle. In other embodiments, the AWD electrical drive unit 224 may be positioned rearward of the rear axle. In yet other embodiments, the AWD electrical drive unit 224 may be positioned forward of the rear axle. In any event, the AWD electrical drive unit 224 may be located towards the rear of the vehicle and positioned near the rear axle. In addition, a fuel tank 232 (e.g., a liquid or gas fuel tank) may be located in the rear of the vehicle 200. The fuel tank 232 may be positioned rearward of the AWD electrical drive unit 224, for example, in one embodiment. In other embodiments, the fuel tank 232 may be positioned partially aligned with the rear axle. In some embodiments, the fuel tank 232 may be positioned adjacent to the rear axle. In further embodiments, the fuel tank 232 may be located either partially above or below the AWD electrical drive unit 224. With the AWD electrical drive unit 224 and fuel tank 232 coupled to the rear of the chassis, additional weight of the HV battery can overload the rear axle 222.

In another embodiment, the HV battery may be located in the engine compartment 208 but at least partially below the engine 216 and/or electric motor or other power system. While this allows for better weight distribution and rear seat capacity in the vehicle 200, the clearance between the HV battery and the underlying ground is reduced. It may be undesirable for an object to contact the HV battery as this can damage the HV battery and/or the vehicle.

Thus, if the HV battery is located upfront in the engine compartment 208 and at least partially above the engine, this can better balance the weight distribution across the vehicle 200. The modification of the vehicle by raising the frame or chassis 202 enables or at least partially creates the additional space above the engine 216 and/or electric motor or other power system for the HV battery. Moreover, the AWD electrical drive unit 224 and fuel tank 232 can be located in the rear of the vehicle 200 and the location of the HV battery upfront allows for one or more passengers in the rear of the vehicle 200, i.e., more capacity for rear seating with the HV battery upfront. This placement also better protects the HV battery. For example, in this location, the surrounding frame and firewall can protect passengers in the interior or cab of the vehicle 200 in the event of an accident. In some embodiments, with the HV battery located near the engine and/or electric motor or other power system, the HV battery may gain additional capacity in colder temperatures due to heat being dissipated from the engine.

The HV battery may also include a high voltage cable 230 or harness, as shown in FIG. 2. With the HV battery upfront, the original cable 230 accompanying the HV battery may be used without requiring any modification or lengthening. In other words, the length of the original cable 230 is satisfactory, or even can be shortened, when the HV battery is located in the engine compartment 208, whereas the cable 230 may be too short if the HV battery is located in the rear of the vehicle.

Figure 3:
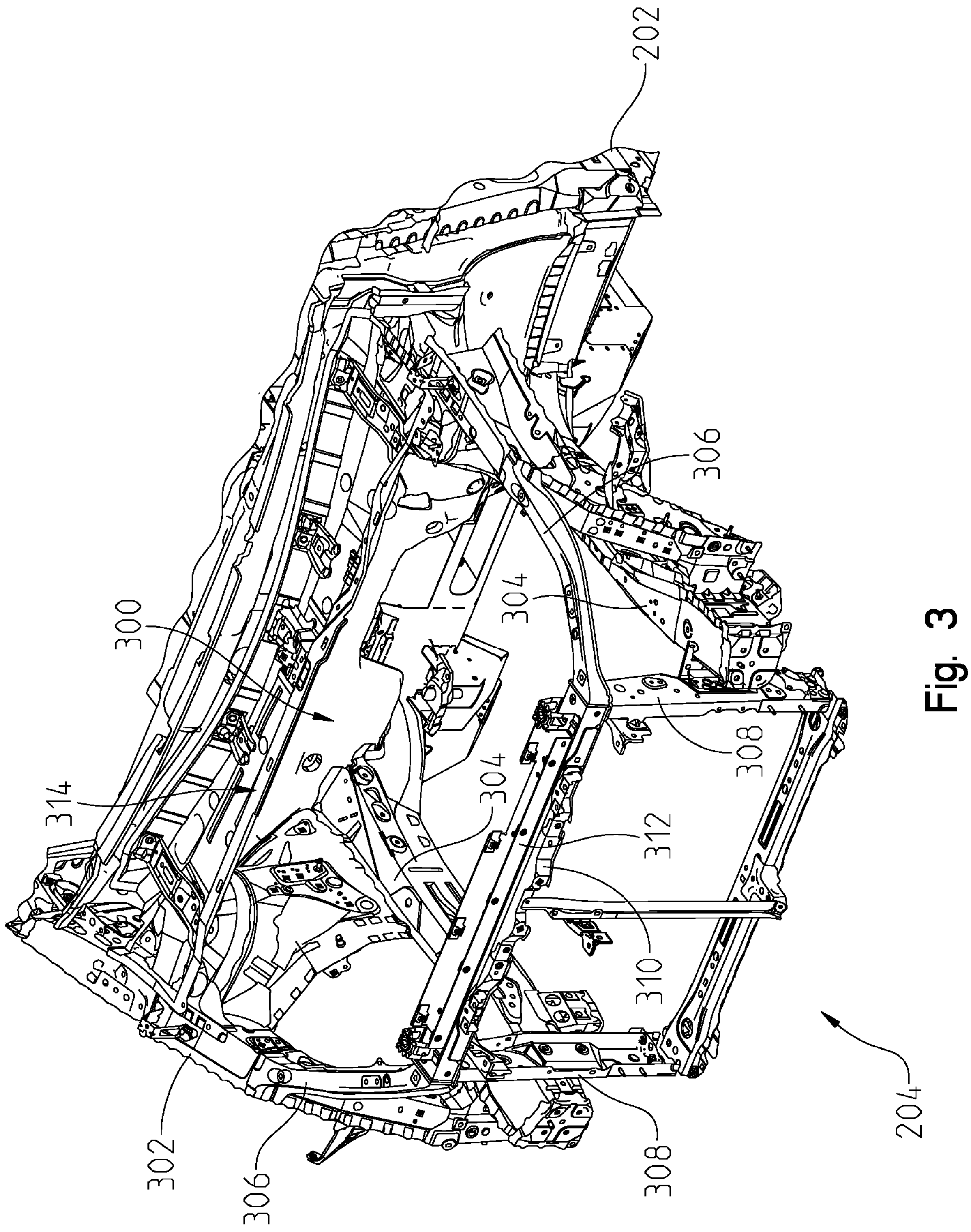
FIG. 3 is a perspective view of an engine compartment of a motorized hybrid vehicle.

Referring now to FIG. 3, one embodiment of an engine compartment 208 of a powered vehicle 200 is shown. In this embodiment, the engine compartment 208 may include an engine bay 300 in which an engine and/or electric motor or part of the vehicle powertrain may be located. The body or chassis 202 of the vehicle 200 may include a first portion 302 thereof coupled or mounted to the A pillar of the vehicle. An inner fender 306 may be coupled to the first portion 302 as well as frame rails 304. In one embodiment, the method of modifying the vehicle by locating the HV battery in the engine compartment 208 may include using the existing or conventional inner fender 306 and frame rails 304.

In some embodiments, the chassis 202 may include a side support 308 located on each side of the vehicle 200 and coupled to the frame rails 304 and inner fender 306. The side support 308 may extended in a generally vertical or upward direction between the frame rails 304 and inner fender 306.

In one embodiment, the vehicle 200 may include a radiator support 310 at the front end 204 thereof. The radiator support 310 may be the original or conventional support. In other embodiments, a new or modified radiator support may be used. The radiator support may be configured to couple to a radiator (not shown). In the illustrated embodiment, a radiator support bracket 312 may be provided and coupled to the radiator support 310. The radiator support bracket 312 may be new structure incorporated with the vehicle 200 to assist with moving the HV battery to the engine compartment 208.

Figure 4A:
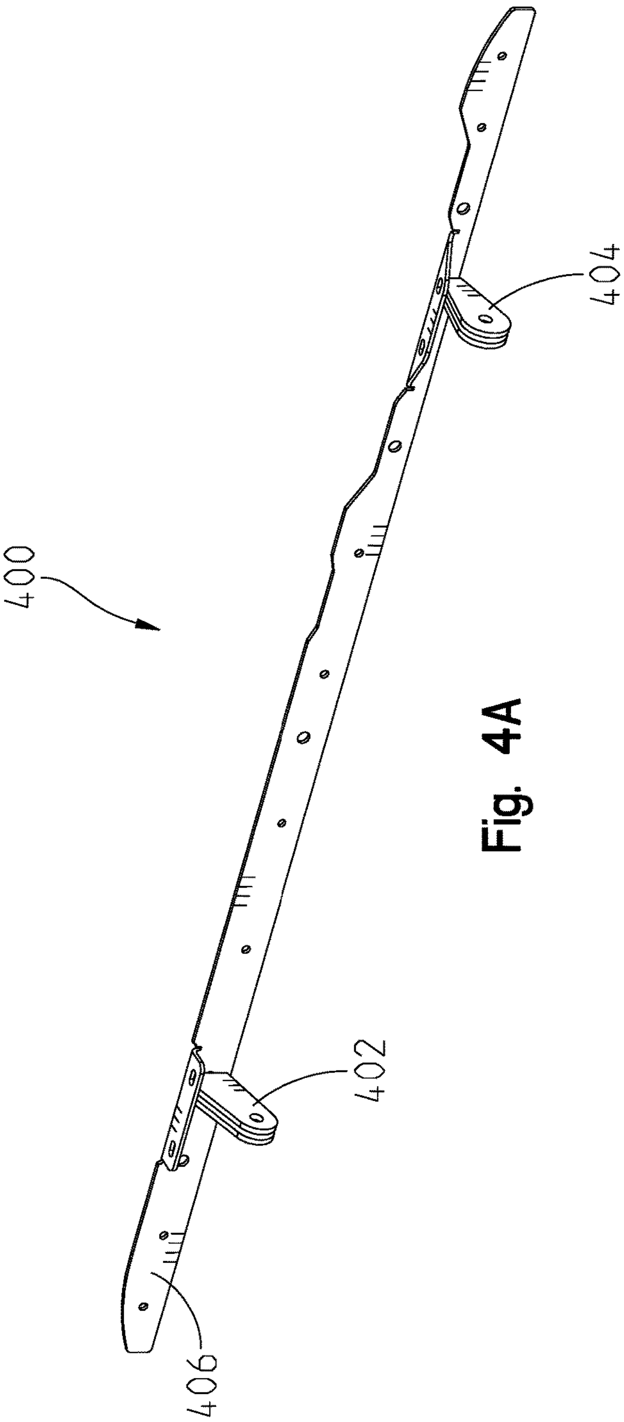
FIG. 4A is a perspective view of a cowling support.

In some embodiments, a cowling support 400 may be coupled at a location 314 in the engine compartment 208. The cowling support 400, as shown in FIG. 4A, may be coupled (e.g., welding, fasteners, etc.) to a face of the existing or conventional cowling. The cowling support 400 may be formed from an elongated member having a front face 406. The front face 406 may be coupled to the cowling, in some embodiments. In one embodiment, the cowling support 400 may include one or more hinges. In FIG. 4A, for example, the cowling support 400 may include a first hinge 402 and a second hinge 404. Each hinge may be coupled to the front face 406 of the support 400. As will be described, the HV battery may be coupled to the hinges 402, 404 to allow the HV battery to pivot between a lowered position and a raised position.

Figure 4B:
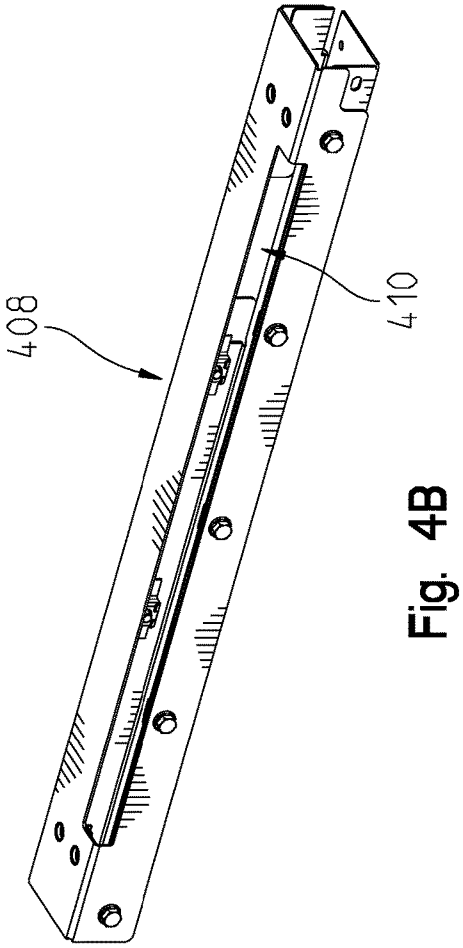
FIG. 4B is a perspective view of a radiator support cap.

In one embodiment, a top radiator support cap 408 may be provided (FIG. 4B). The radiator support cap 408 may include a slot 410 defined at least partially in front portion thereof. In some embodiments, the radiator support cap 408 may fit on top of and/or be coupled to the radiator support bracket 312.

Figure 5:
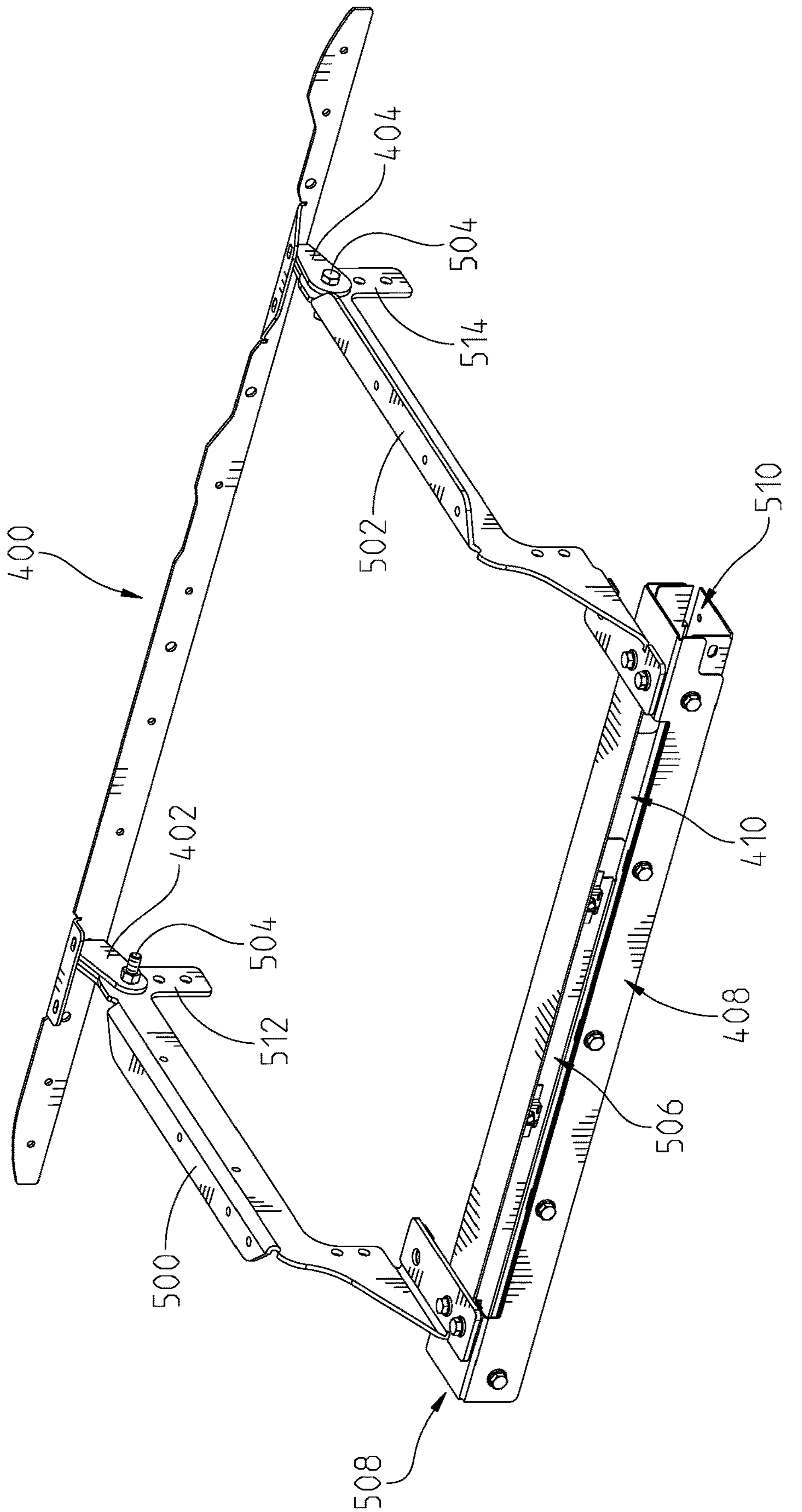
FIG. 5 is a front perspective view of a pair of brackets coupled to the cowling support of FIG. 4A and the radiator support cap of FIG. 4B.

As shown in the embodiment of FIG. 5, the radiator support cap 408 may have a first end and a second end. The aforementioned slot 410 may form a first intake inlet, whereas the first end may form a second intake inlet 508 and the second end may form a third intake inlet 510. The intake inlets may allow air or other cooling fluid to flow into and through the radiator support cap 408. Moreover, this air or other cooling fluid may flow into and help cool the engine 216. These intakes may be incorporated into the cap 408 from the original chassis 202 such that air or other cooling fluid can flow in through the front and each end of the support cap 408.

As also shown in the embodiment of FIG. 5, a first support bracket 500 and a second support bracket 502 may be provided. The first and second support brackets may extend between the cowling support 400 and the radiator support cap 408. In one embodiment, the first support bracket 500 may be coupled to the first hinge 402. In another embodiment, the second support bracket 502 may be coupled to the second hinge 404. In this way, the first and second support brackets may pivot relative to the cowling support 400 via the first and second hinges.

Figure 6:
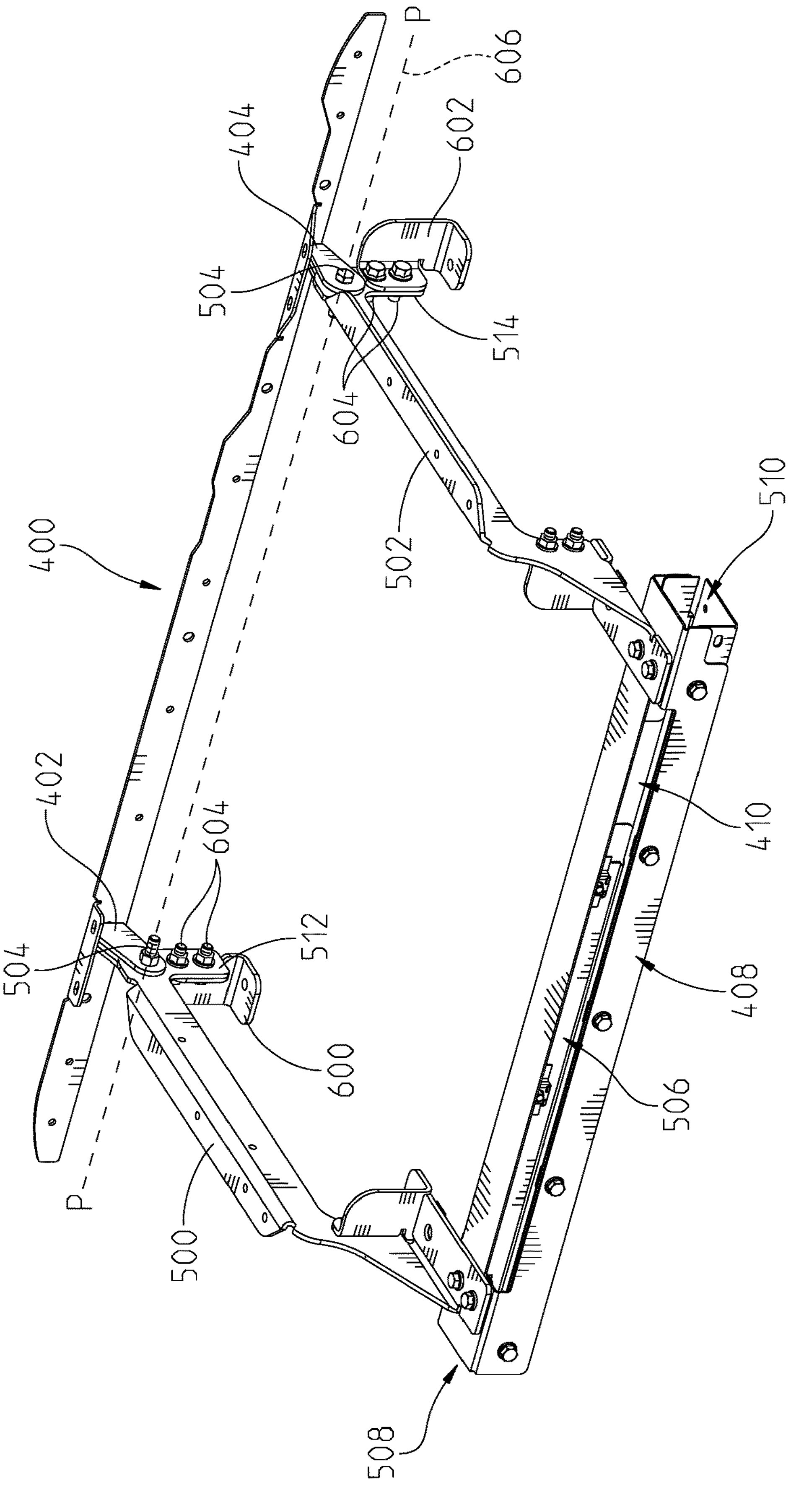
FIG. 6 is a perspective view of the brackets of FIG. 5 with mounting brackets.

In the illustrated embodiment of FIG. 5, a fastener 504 may be coupled to each hinge and the corresponding support bracket. As shown in the embodiment of FIG. 6, a pivot axis 606 may be defined through the respective fasteners 504. As such, each fastener 504 is coaxially aligned with the pivot axis 606.

In some embodiments, the first support bracket 500 may include a first bracket member 512 that extends downwardly or at least generally downwardly at or near the coupling with the first hinge 402. The first bracket member 512 may include a plurality of openings as shown in FIG. 5. In other embodiments, the second support bracket 502 may include a second bracket member 514 that extends downwardly or at least generally downwardly at or near the coupling with the second hinge 404. The second bracket member 514 may include a plurality of openings as shown in FIG. 5.

The first and second support brackets may be coupled to the radiator support cap 408 at ends opposite the hinges. As shown, the first support bracket 500 may have a first mount portion 706 and the second support bracket 502 may have a second mount portion 708. Each mount portion may include a plurality of openings defined therein. Each of the plurality of openings may be aligned with corresponding openings 1206, 1208 formed in a top surface 712 of the radiator support cap 408 (see FIG. 4B). Thus, a plurality of fasteners 710 (FIG. 7) may be used to removably couple the first and second support brackets 500, 502 to the radiator support cap 408. In some embodiments, with the fasteners 710 coupling the support brackets to the radiator support cap 408, the support brackets (and thus the HV battery 800) is unable to pivot from its lowered position. When the fasteners 710 are removed, the support brackets (and thus the HV battery 800) may be pivoted from the lowered position to its raised position.

In some embodiments, the first and second support brackets 500, 502 may include a substantially flat portion located between its pair of ends. In FIG. 5, the substantially flat portion of the first and second support brackets may be disposed in a substantially horizontal plane. Each flat portion may include a plurality of openings configured to receive fasteners. The substantially flat portions of the first and second support brackets may form flanges as shown in FIG. 5.

Turning to FIG. 6, an embodiment of the first and second support brackets 500, 502 is further shown including a first HV battery mounting bracket 600 and a second HV battery mounting bracket 602. The first HV battery mounting bracket 600 may be coupled to the first bracket member 512 and the second HV battery mounting bracket 602 may be coupled to the second bracket member 514. In some embodiments, a plurality of fasteners 604 may be used to couple the respective bracket member and HV battery mounting bracket. In one embodiment, a portion of the HV battery 800 (FIG. 8) may be coupled to each HV battery mounting bracket. In another embodiment, each HV battery mounting bracket may be coupled to a housing 904 (FIG. 9) which substantially encloses the HV battery 800. As shown in FIG. 6, each HV battery mounting bracket includes an ear portion with an opening defined therethrough for coupling the HV battery mounting bracket to another structure (e.g., the HV battery, housing, etc.).

Figure 7:
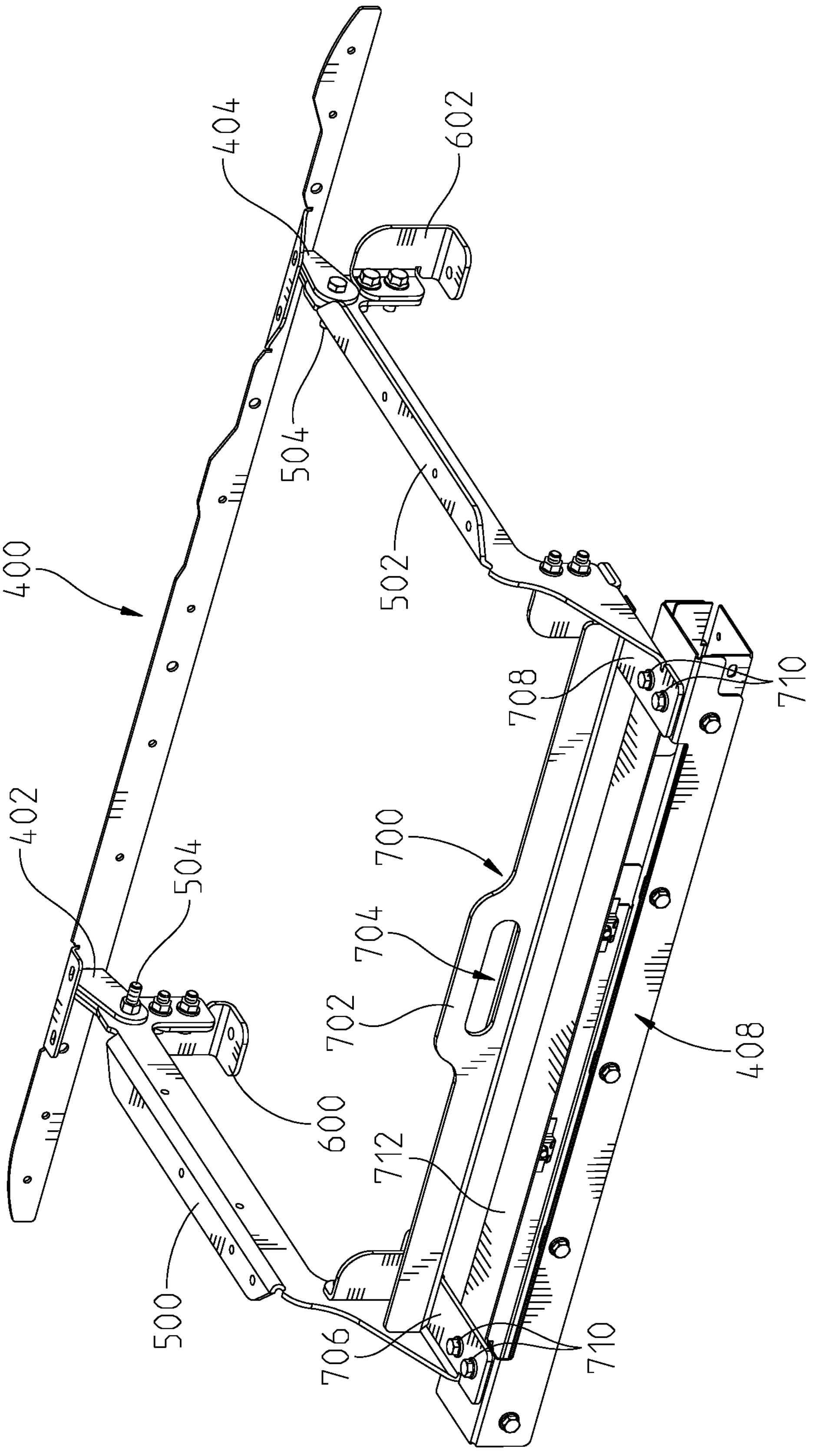
FIG. 7 is a perspective view of a handle assembly coupled to the brackets and radiator support cap.

In one embodiment, a HV battery mounting bracket may be coupled at each end of the respective support bracket. In FIG. 6, only the first and second mounting brackets 600, 602 are clearly shown, but in other embodiments another mounting bracket may be coupled to the first support bracket 500 adjacent to the first mount portion 706. Likewise, another mounting bracket may be coupled to the second support bracket 502 adjacent to the second mount portion 708. In FIGS. 6 and 7, these additional mounting brackets are partially visible but otherwise blocked by the support brackets. In this embodiment, there are up to four mounting brackets whereby at least two are coupled to each support bracket. In other embodiments, there may be 6, 8, 10, . . . mounting brackets as part of the HV battery mounting assembly.

In an embodiment illustrated in FIG. 7, the system or kit for modifying the vehicle to relocate the HV battery to the engine compartment 208 may include a handle or lift assembly 700. In this embodiment, the handle or lift assembly 700 may include a handle 702 with a defined opening 704 for manipulating the handle or lift assembly 700. In some embodiments, the handle or lift assembly 700 may be manually operated to raise or lower the HV battery and its mounting assembly (i.e., the structure of FIG. 7). In other embodiments, a hoist or other machine operated mechanism may be used to raise and lower the HV battery and its mounting assembly via the handle or lift assembly 700. One skilled in the art may consider additional conventional ways to pivot the HV battery and its mounting assembly via the hinges 402, 404 between the lowered and raised positions.

Figure 14:
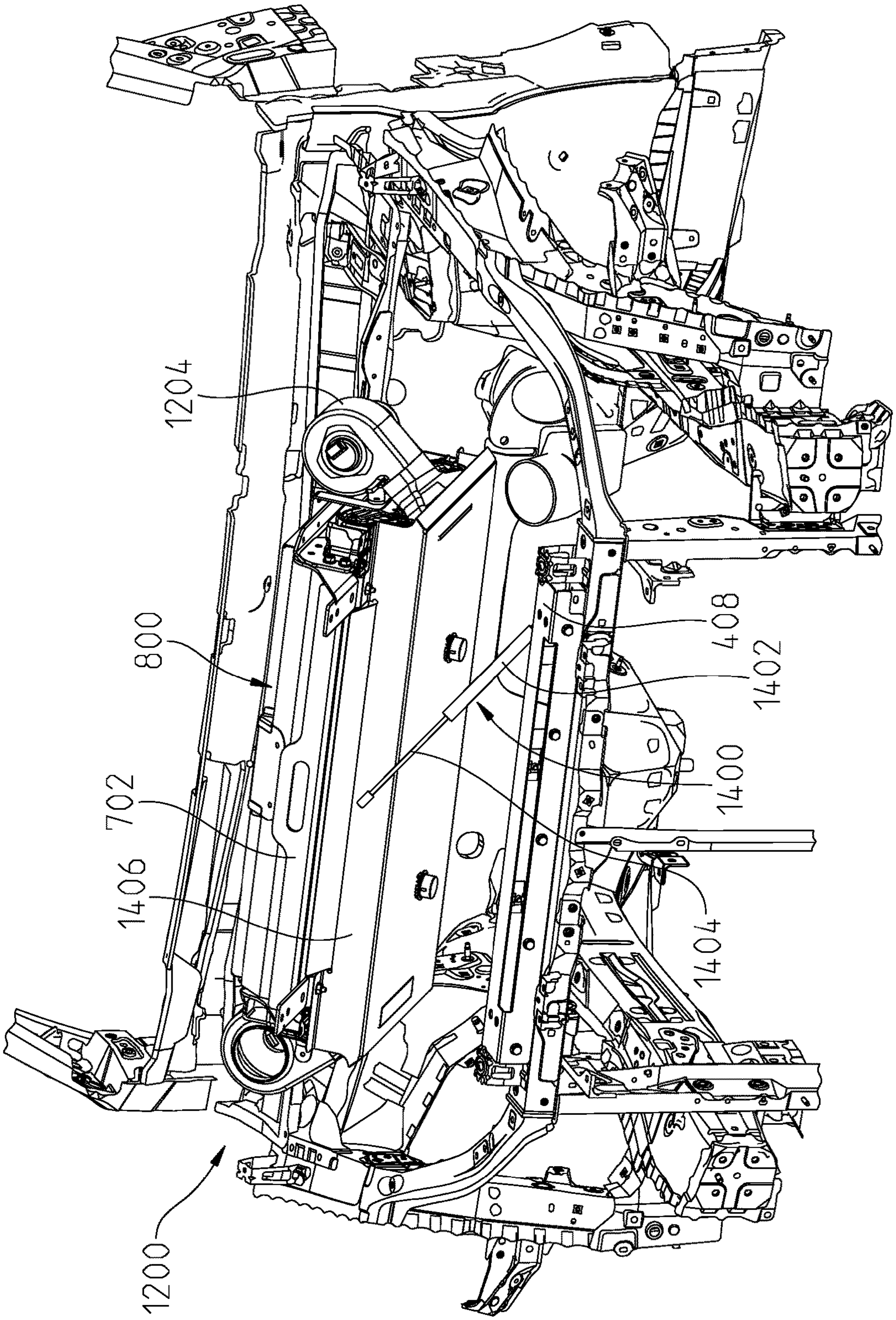
FIG. 14 is a perspective front view of another embodiment of the battery in an upwardly pivoted position.

In FIG. 14, for example, an alternative embodiment is illustrated. Here, an actuator assembly 1400 may be used to partially support the movement of the HV battery 800 between its lowered and raised positions. In FIG. 14, the HV battery 800 is shown in its raised position. The actuator assembly 1400 may include a base or cylinder end 1402 and a rod end 1404. The rod end 1404 may move within and relative to the base or cylinder end 1402. In this embodiment, the rod end 1404 may be coupled to a portion or surface 1406 of the HV battery 800 or its housing 904. This coupling may be achieved via fasteners, welding, adhesive, or any other known coupling method. Alternatively, the rod end 1404 may be coupled to a portion of the handle or lift assembly 700. In yet another embodiment, the rod end 1404 may be coupled to a portion of the HV battery mounting assembly such as one of the support brackets 500, 502, one of the bracket members 512, 514, one of the HV battery mounting brackets 600, 602, or some other structure thereof.

In some embodiments, the base or cylinder end 1402 may be coupled to the radiator support cap 408. In other embodiments, the base or cylinder end 1402 may be coupled to a portion of the vehicle frame or chassis 202 such as a frame rail 304, an inner fender 306, a side support 308, the radiator support 310, radiator support bracket 312, or any other structure.

Figure 8:
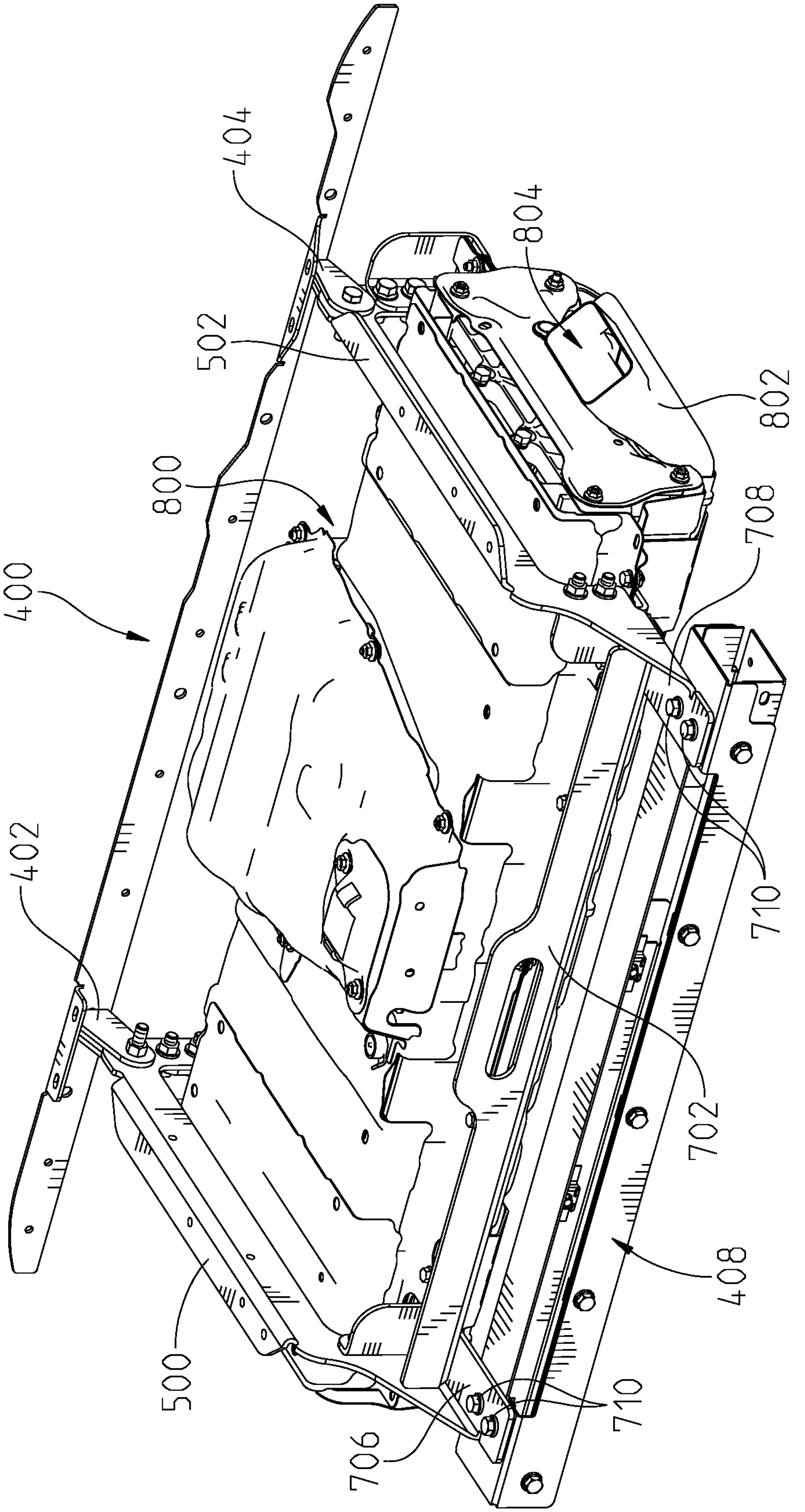
FIG. 8 is a perspective view of a high electrical voltage battery located in the engine compartment of FIG. 3.

Referring to FIG. 8, one embodiment of the HV battery 800 is shown. In one embodiment, the HV battery 800 may be the original equipment manufacturer (OEM) HV battery. In another embodiment, the HV battery 800 may be a new HV battery, where the original HV battery is removed and replaced. In other embodiments, the HV battery 800 may be new to the vehicle because the vehicle did not originally include a HV battery.

With the HV battery 800, a cooling system is disclosed in the present disclosure to provide an airflow or other cooling fluid from a remote location such as the cab of the vehicle to help cool the HV battery 800 during operation. In one embodiment, the cooling system may include a first cooling duct 802 located on a first side of the HV battery 800. The first cooling duct 802 may include a first inlet 804 for receiving a cooling fluid. The first inlet 804 may be fluidly coupled to the HV battery 800 to provide the cooling fluid thereto.

Figure 9:
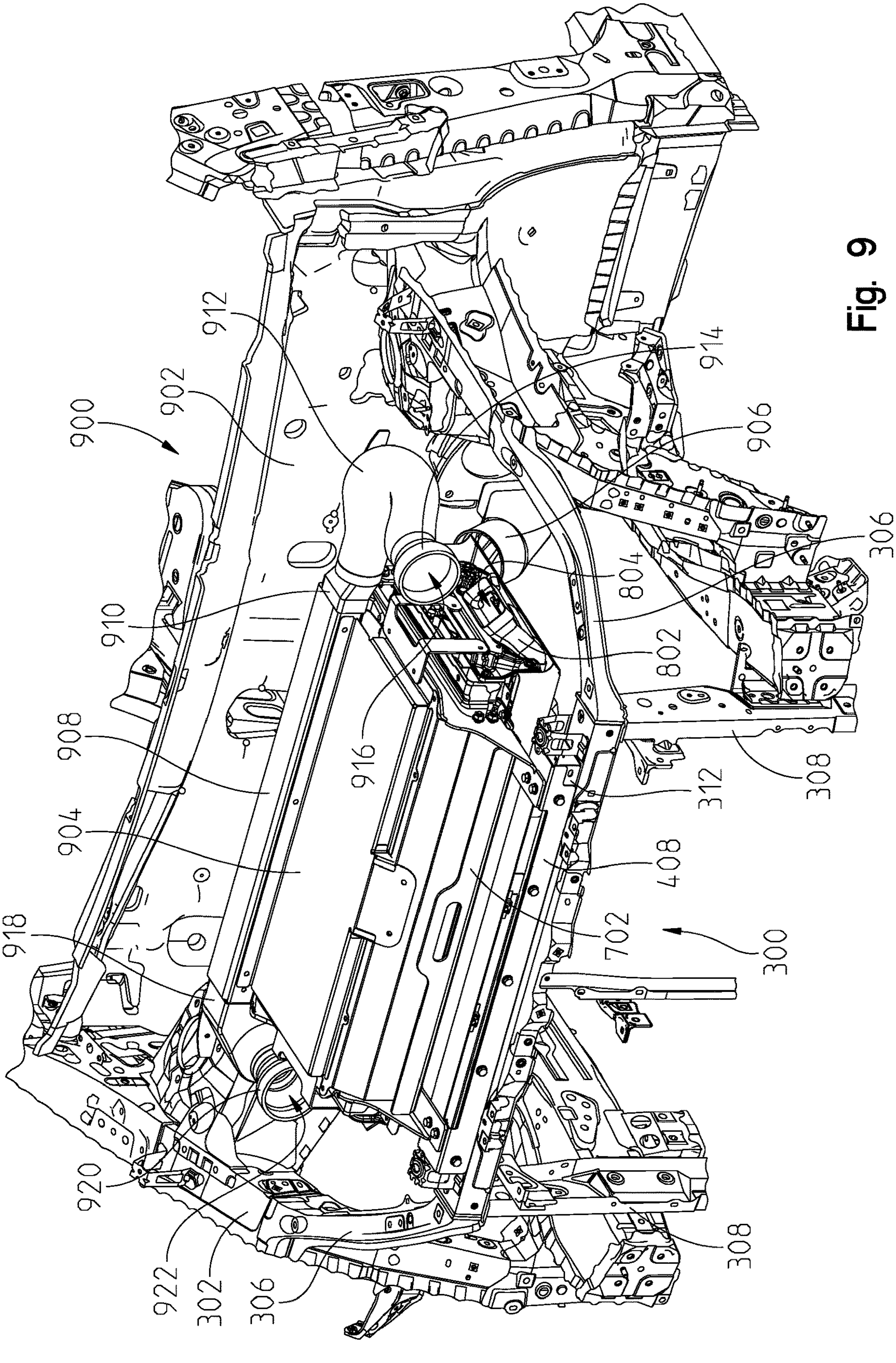
FIG. 9 is another perspective view of the high electrical voltage battery of FIG. 8 coupled in the engine compartment of FIG. 3.

In the embodiments of FIGS. 8 and 9, the HV battery 800 is shown in its lowered position. Here, the fasteners 710 may be used to couple the first and second support brackets 500, 502 to the radiator support cap 408. To raise the HV battery 800 and its mounting assembly, the fasteners 710 may be removed thereby decoupling the support brackets from the radiator support cap 408. Once the fasteners are removed, the HV battery 800 may be lifted or raised via the handle or lift assembly 700.

In FIG. 9, an embodiment of the HV battery 800 and its mounting assembly is further shown with additional detail regarding the aforementioned cooling system. In this embodiment, a firewall 902 of the vehicle 200 is shown which separates the engine compartment 208 or bay 300 from an interior or cab area 900 of the vehicle. The firewall 902 may extend between opposite sides of the chassis 202, and specifically the chassis portion tied to the A-pillar 302. In the embodiment of FIG. 9, an outer, protective housing 904 may substantially enclose the HV battery 800 and protect it from the surrounding environment such as water, snow, ice, dirt, dust, other debris, etc. The cooling system may be able to provide airflow or other cooling fluid to the interior of the housing 904 to help cool the HV battery 800.

Figure 10:
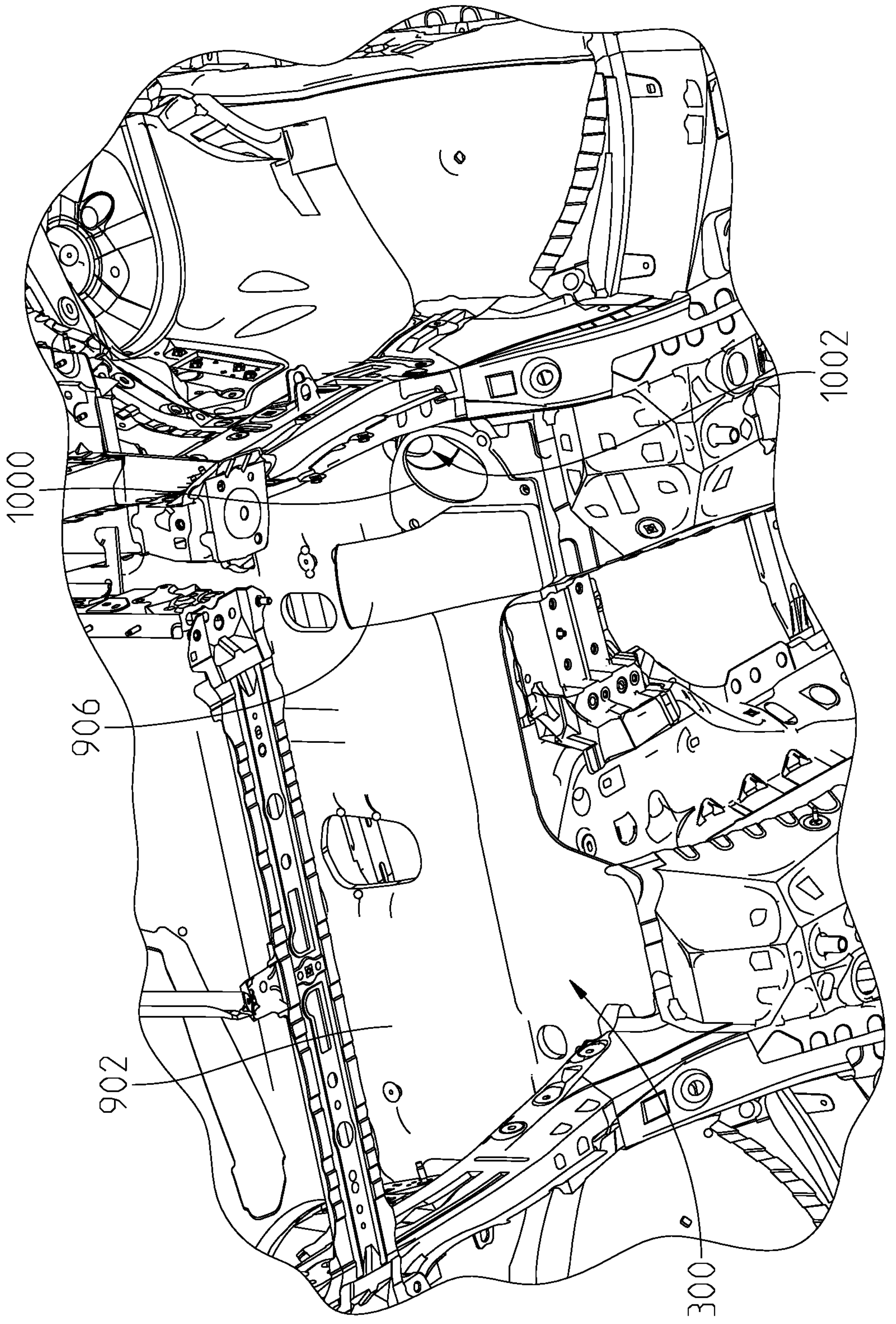
FIG. 10 is a perspective view a steering boot and ducting port as viewed from the engine compartment.

In some embodiments, the cooling system of the present disclosure may include a ducting port 906 coupled to the firewall 902. As shown in the embodiment of FIG. 10, the ducting port 906 may be coupled to a portion of a steering boot 1000 located in the cab area 900. A steering shaft (not shown) of the vehicle may come through the steering boot 1000. The steering boot 1000 may be a multi-piece structure such that a portion of the boot 1000 is located in the cab area 900 or cab side of the firewall 902 and boot or duct portion on the engine bay side thereof. An opening 1002 is formed in the steering boot 1000 to provide airflow or other cooling fluid from the cab area 900 to the ducting port 906. The ducting port 906 may be coupled to the boot 1000 by a coupling mechanism. This may be via a snap coupling, a tongue-in-groove connection, a latching connection, the use of fasteners, or any other known way of coupling the two structures together.

In several embodiments, the cooling system may include a cooling duct 908. The cooling duct 908 may be part of the housing 904, or it may be additional structure that is coupled to the housing 904 or is located above the housing 904. In one embodiment, the cooling duct 908 may receive air or other cooling fluid via the ducting port 906. In other embodiments, the cooling duct 908 may receive air or other cooling fluid from a fan or other device (e.g, the radiator). In any event, the cooling duct 908 may have a first end and a second end. At the first end, the cooling duct 908 may be coupled to a first duct coupler 910. At the second end, the cooling duct 908 may be coupled to a second duct coupler 918.

In some embodiments, a flexible hose 912 may be coupled between the first duct coupler 910 and a first fan coupler 914. A fan (not shown in FIG. 9) may be coupled to the first fan coupler 914. The fan may also be coupled to the first cooling duct 802 such that the fan is able to suction air or other cooling fluid from the cooling duct 908 through the first duct coupler 910, the hose 912, and first fan coupler 914 and provide the flow of air or other fluid to the first cooling duct 802. As shown in FIG. 9, the first fan coupler 914 may have a defined outlet 916 through which air or other cooling fluid flows to the fan (not shown).

In one embodiment, the second duct coupler 918 may be coupled to a second fan coupler 920 which includes a defined outlet 922 through which air or other cooling fluid may be suctioned from the cooling duct 908 via another fan (not shown). The other fan (not shown) may be coupled to the second fan coupler 920 via fasteners or other known mechanism.

In several embodiments, the first and second fan couplers may also be known as reducers. The reducers may be used to restrict or otherwise control the flow of air or other cooling fluid. In other embodiments, the fan couplers are not reducers and do not restrict or otherwise control the flow of air or cooling fluid.

Figure 11:
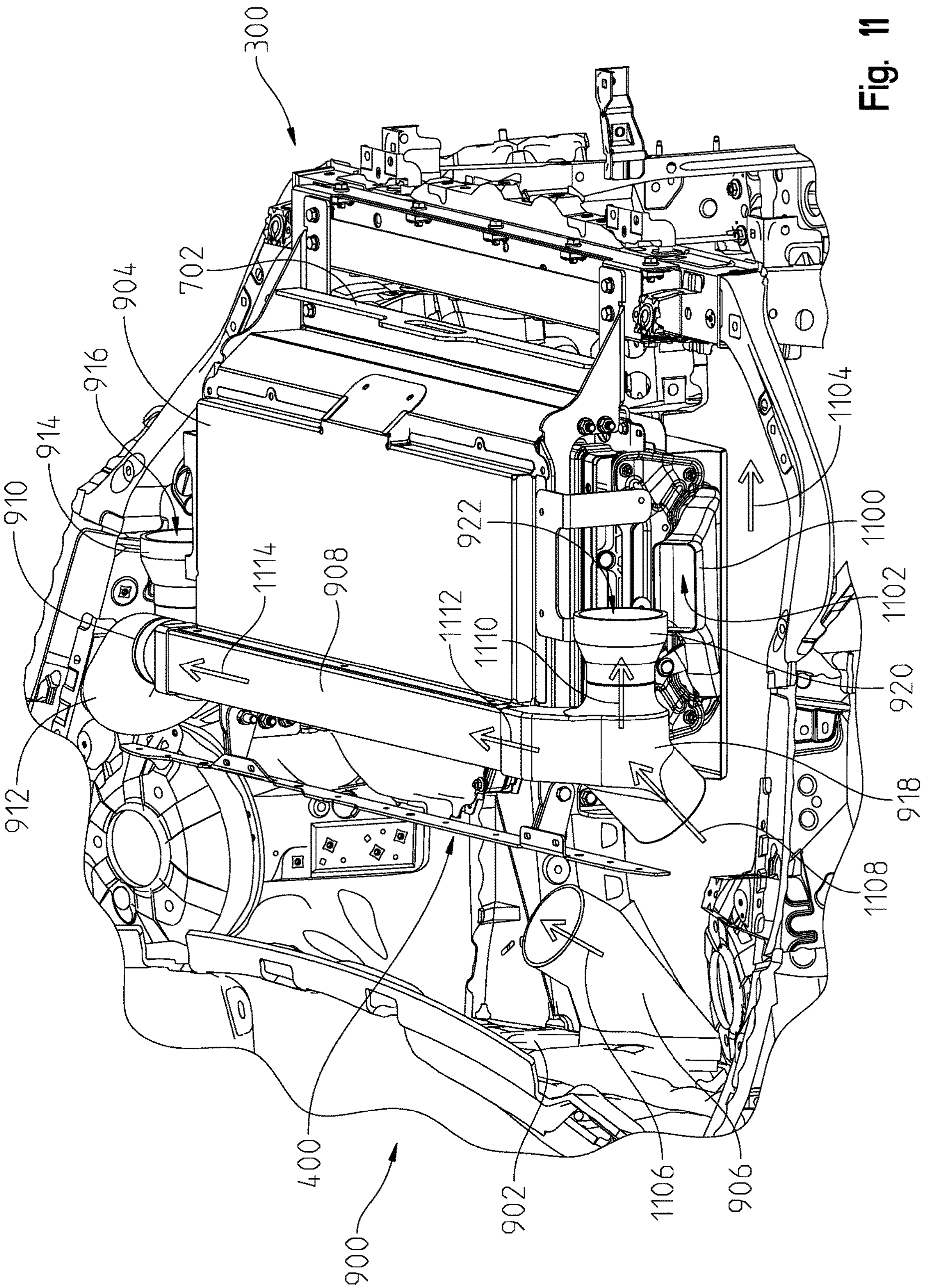
FIG. 11 is a perspective side view of the battery of FIG. 8 with ducting for providing cooling to the battery.

In one embodiment depicted in FIG. 11, the HV battery 800 is shown in its lowered position. In addition, the opposite side of the HV battery and its mounting assembly are shown. Similar to the side illustrated in FIGS. 8 and 9, the cooling system may include a second cooling duct 1100 coupled to the HV battery 800 or its outer housing 904. The second cooling duct 1100 may include an inlet 1102 as shown. The second cooling duct 1100 may be located in a different location compared to its original location before the HV battery 800 is moved into the engine compartment 208. Specifically, in the method of modifying the vehicle to move the HV battery upfront in the location shown in FIG. 11, the second cooling duct 1100 may be repositioned forward of its original location to provide space for a radiator overflow reservoir (not shown). In this embodiment, the second cooling duct 1100 is moved forward from its original location whereas the first cooling duct 802 is not moved.

A fan (not shown) may be coupled to the inlet 1102 of the second cooling duct 1100. Moreover the fan may be coupled to the second fan coupler 920 such that the fan is capable of drawing air or other cooling fluid through the second fan coupler 920 and out of its outlet 922 and pushed through the inlet 1102 and into the second cooling duct 1100 to cool the HV battery 800.

In the embodiment of FIG. 11, the flow of air or other cooling fluid is schematically illustrated between the cab area 900 of the vehicle to the HV battery 800. In this embodiment, a fan (not shown) may be located on each side of the HV battery 800 and coupled to the respective first and second fan couplers. Each fan (not shown) may be operably controlled by a controller (not shown) to operate either in a constant mode (e.g., fan is always running so long as it is being powered) or in an as-needed or controlled mode. Each fan may be similar, for example, to a first fan 1204 shown in FIG. 12 of the present disclosure. The fan located on the side shown in FIG. 11 may be referred to as a second fan 1204 even though it is not shown in FIG. 11. In some embodiments, the fans 1204 may be the original or existing fans. These may be OEM fans, for example. In other embodiments, the fans 1204 may be new and replace the original fans.

As the fans 1204 are running, they may pull or suction airflow or other cooling fluid from the cab area 900 or from a remote location. In this embodiment, air from the cab 900 may be pulled through the ducting port 906 via a first flow direction 1106. It is noted that the airflow from the cab area 900 to the HV battery 800 is in a generally forward direction 1104. As the air flows through the ducting port 906 in the first flow direction, it may flow into a hose (not shown) which is coupled between the ducting port 906 and the second duct coupler 918. The fluid flow may flow in a second flow direction 1108 through an inlet of the second duct coupler 918 via an inlet.

In some embodiments, the second duct coupler 918 may include an inlet and an outlet. In other embodiments, the second duct coupler 918 may include an inlet and a plurality of outlets. In the embodiment of FIG. 11, for example, the second duct coupler 918 may include the inlet and a first outlet and a second outlet. The first outlet of the second duct coupler 918 may be coupled to the second fan coupler 920. Air or other cooling fluid may flow through the first outlet and into the second fan coupler 920 via a third flow direction 1110. In this embodiment, the second fan 1204 coupled to the second fan coupler 920 may draw or suction the flow of air or cooling fluid through the second fan coupler 920 and then push or blow the air or cooling fluid into the second cooling duct 1100 where it is able to cool the HV battery 800.

At the same time, air or cooling fluid may also flow through the second outlet of the second duct coupler 918 into the cooling duct 908 along a fourth flow direction 1112. The air of cooling fluid may flow through the cooling duct along a fifth flow direction 1114 before it flows through the first duct coupler 910, the hose 912, and the first fan coupler 914. The first fan 1204 may draw or suction the air or cooling fluid through the first fan coupler 914 and then push or blow the air or cooling fluid into the first cooling duct 802 where it is able to cool the HV battery 800.

Figure 13:
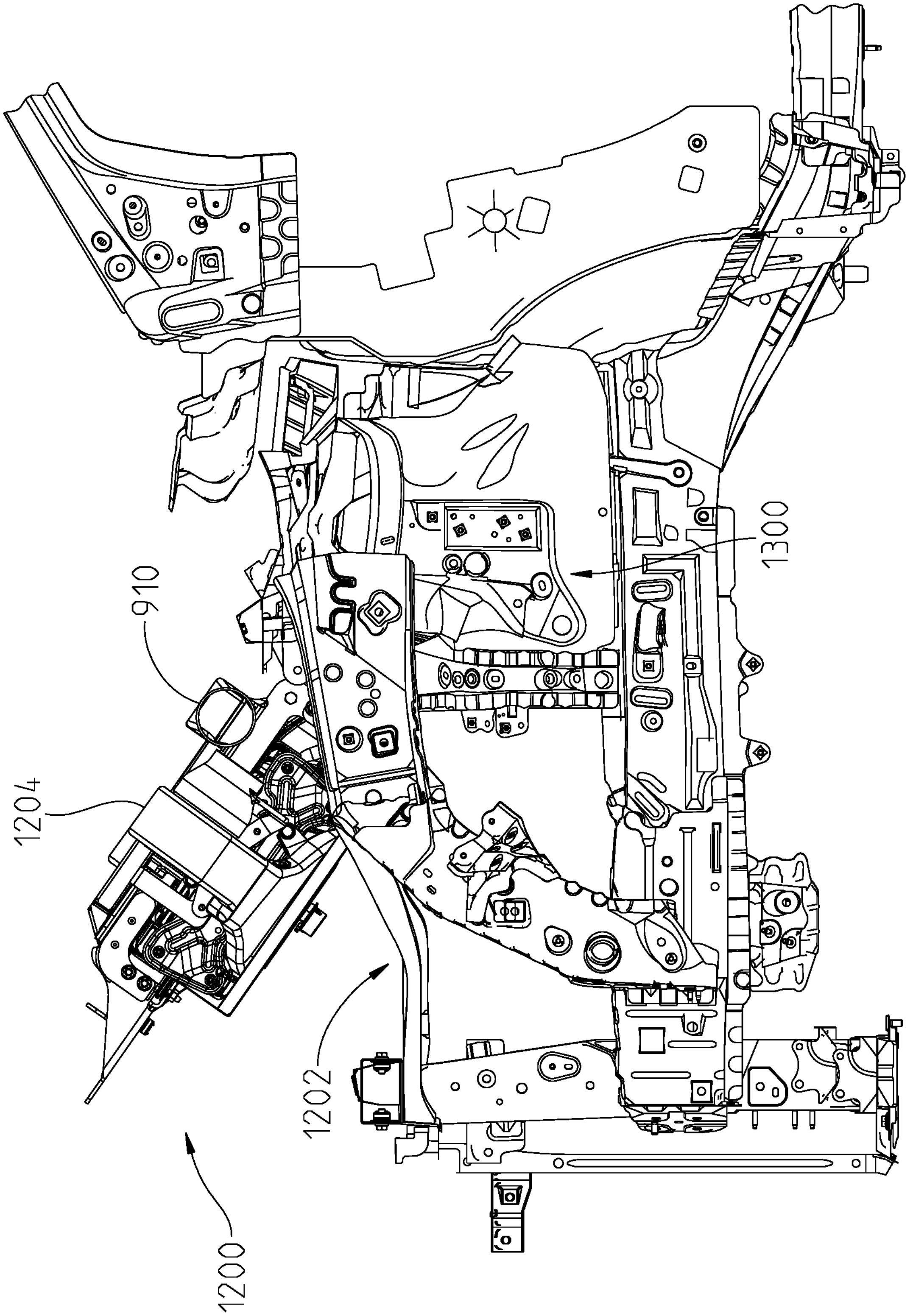
FIG. 13 is a perspective side view of the battery in the upwardly pivoted position.

In some embodiments, the cooling air or other fluid may also be used to cool the engine 216 or other components of the power system 1300 (see FIG. 13). In several embodiments, the radiator (not shown) may be capable of providing additional air or cooling fluid used to cool the HV battery 800, engine 216 and/or power system 1300. In other embodiments, a reservoir of cooling fluid such as air, water, or other fluid may be used as cooling agents for the HV battery, engine and/or power system. For instance, in one embodiment, a heat exchanger may be used to run cool water, air or other fluid therethrough for cooling the HV battery, engine, and/or power system.

Figure 12:
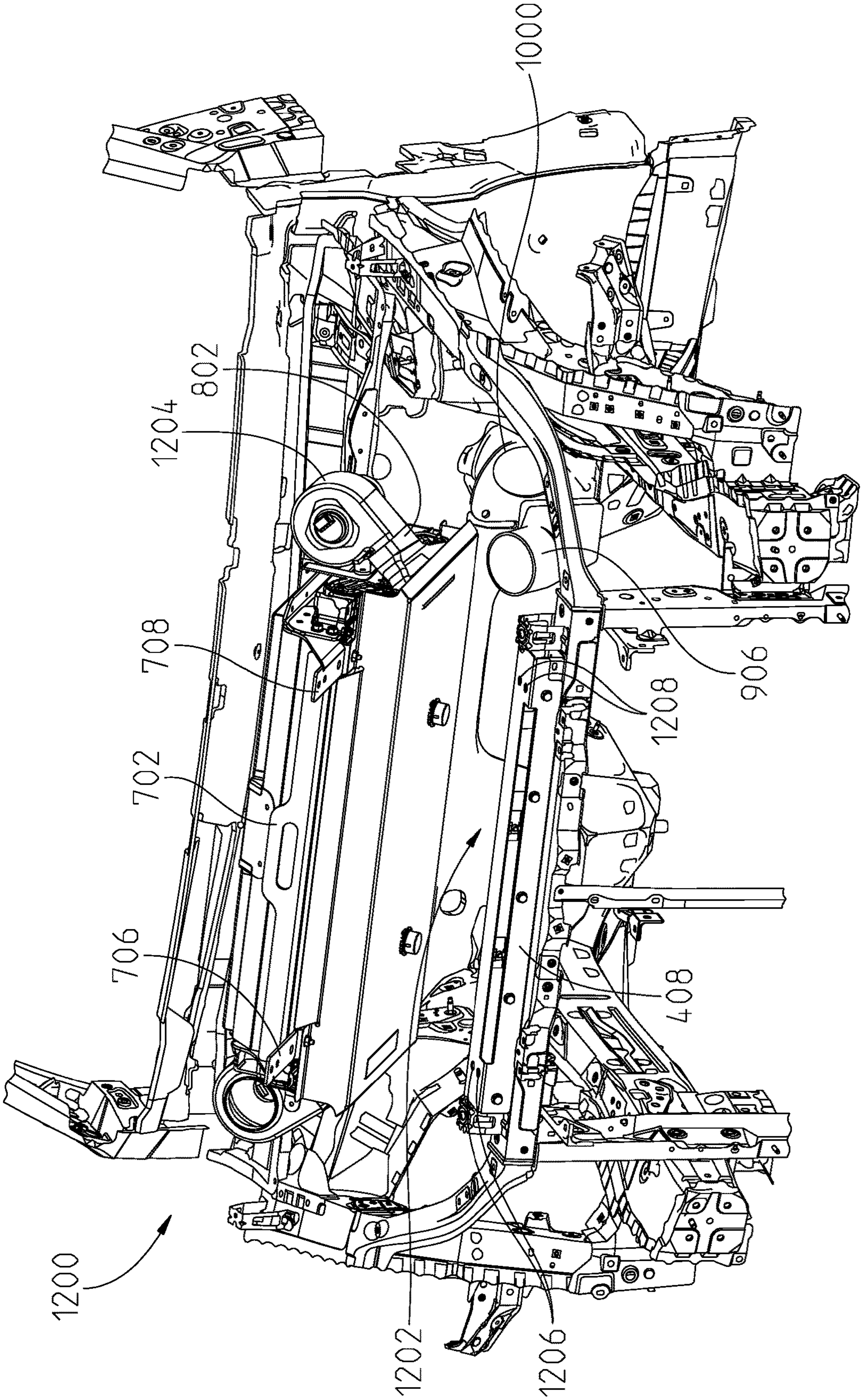
FIG. 12 is a perspective front view of the battery in an upwardly pivoted position.

In FIG. 12, one embodiment of the HV battery 800 and its mounting assembly is shown in its raised position 1200. In this embodiment, the fasteners 710 may be removed from the openings 1206, 1208 formed in the radiator support cap 408 to enable a user, a hoist, or other device to manipulate the handle or lift assembly 700 to pivot the HV battery 800 and its mounting assembly about the first and second hinges 402, 404 to the raised position 1200. As shown in FIG. 12, with the HV battery 800 and its mounting assembly in the raised position 1200, an open area or cavity 1202 is formed between the HV battery 800 and the engine 216. With the HV battery 800 pivoted to its raised position 1200, maintenance or service may be performed on the engine 216 or other hardware components otherwise located adjacent to or below the HV battery 800. Moreover, while not shown in FIG. 12 or 13, the actuator assembly 1400 may be optionally incorporated to assist with movement of the HV battery 800 and maintaining its location in the raised position as desired. In other embodiments, other structure such as a rod or other device may be used to hold or maintain the HV battery and its mounting assembly in the raised position. The rod or other device may be removable such that it is removed when it is desired to lower the HV battery and its mounting assembly the lowered position.

In an alternative embodiment of the present disclosure, the powered vehicle may include a power system in which each wheel is powered individually and independently. For instance, in one embodiment, the power system may include an electric motor producing electrical power to operably drive an individual wheel. Alternatively, in other embodiments, the power system may include a hydraulic motor for operably driving an individual wheel. In some embodiments, the powered vehicle may not include an engine or other power system located in the engine compartment 208 as described in previous embodiments. In one or more of these embodiments, a power-producing device such as an electric motor may be located at each wheel or at another location of the vehicle. In any event, the HV battery may still be relocated from any location of the vehicle to the front compartment 208 of the vehicle. In some embodiments, the HV battery may be positioned such that it is aligned or at least partially aligned with a front axle of the vehicle. In several embodiments, the HV battery may be located forward of the front axle, whereas in other embodiments the HV battery may be located rearward of the front axle.

The relocation of the HV battery may also include positioning the HV battery in the front compartment 208 such that it is located above or at least partially above the front axle. In other embodiments, the HV battery may be positioned in the front compartment 208 such that it is located below or at least partially below the front axle.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A powered vehicle, comprising:

a chassis having a front end and a rear end;

at least one front wheel and at least one rear wheel for supporting the chassis, the at least one front wheel defining a front axle and the at least one rear wheel defining a rear axle;

a first portion of the vehicle defining an interior;

a second portion of the vehicle located outside of the interior, the first and second portions at least partially separated by a wall;

a power system for propelling the vehicle, the power system located in the second portion; and a HV battery for producing electrical power to propel the vehicle, the HV battery being coupled to the chassis and located in the second portion, wherein the HV battery at least partially overlies a power-producing device of the power system.

2. The vehicle of claim 1, wherein the HV battery is located at least partially forward of the power-producing device.

3. The vehicle of claim 1, wherein the HV battery is located directly above the power-producing device.

4. The vehicle of claim 1, wherein the HV battery is located forward of the front axle.

5. The vehicle of claim 1, wherein the power-producing device comprises an engine.

6. The vehicle of claim 1, wherein the power-producing device comprises an electric motor.

7. The vehicle of claim 1, wherein the HV battery is pivotal between a lowered position and a raised position.

8. The vehicle of claim 7, wherein when the HV battery is in its raised position, an open space is formed between the HV battery and power-producing device.

9. The vehicle of claim 1, further comprising an actuator assembly coupled between the HV battery and the chassis.

10. The vehicle of claim 1, further comprising a cooling system coupled between the interior of the vehicle and the HV battery, the cooling system configured to move air from the interior to the HV battery to cool the HV battery.

11. The vehicle of claim 10, wherein the cooling system comprises:

a ducting port coupled to the wall and fluidly coupled to the interior;

a duct coupler fluidly coupled to the ducting port for receiving air therefrom;

at least one fan for suctioning the air from the duct coupler, the at least one fan configured to blow the air from the duct coupler to a cooling duct coupled to the HV battery;

wherein, the air blown from the fan passes through the cooling duct and into the HV battery.

12. A method of modifying an existing powered vehicle, the vehicle including a chassis, a vehicle floor, one or more wheels supporting the chassis, a power system for propelling the vehicle in a travel direction, and a HV battery of the power system, the method comprising:

providing the vehicle with a first portion defining an interior cab and a second portion located external of the cab, the first portion and second portion being at least partially separated by a wall, and a power-producing device of the power system being coupled to the chassis in the second portion;

decoupling the HV battery from the vehicle at a first location below the vehicle floor; and coupling the HV battery of the power system to a second location, the second location being in the second portion or forward of the wall.

13. The method of claim 12, further comprising locating the HV battery at least partially forward of the power-producing device.

14. The method of claim 12, further comprising coupling the HV battery at least partially above the power-producing device in the second portion.

15. The method of claim 12, further comprising:

providing the one or more wheels with a front wheel defining a front axle of the vehicle; and coupling the HV battery to the chassis at least partially forward of the front axle.

16. The method of claim 12, further comprising:

providing the one or more wheels with a front wheel defining a front axle of the vehicle; and coupling the HV battery to the chassis at least partially above the front axle.

17. The method of claim 12, wherein the HV battery is pivotally coupled to the chassis, the method further comprising:

pivoting the HV battery from a lowered position to a raised position; and forming an open space between the HV battery and the power-producing device.

18. The method of claim 12, further comprising providing a HV battery mounting assembly coupled to the HV battery, the HV battery mounting assembly pivotally coupled to the chassis.

19. The method of claim 12, further comprising:

providing an original battery cable coupled to the HV battery;

reusing the original battery cable without adding any length thereto after the coupling step.

20. The method of claim 12, further comprising:

lowering the power-producing device relative to the chassis;

forming a space above the power-producing device; and coupling the HV battery in the space during the coupling step.

* * * * *